US00RE39440E

(19) United States
(12) Reissued Patent
Anspaugh et al.

(10) Patent Number: US RE39,440 E
(45) Date of Reissued Patent: Dec. 26, 2006

(54) SNAP-ON STEERING COLUMN SHROUD

(75) Inventors: Michael Patrick Anspaugh, Bay City, MI (US); Robert W. Dubay, Saginaw, MI (US); Timothy D. Beach, Saginaw, MI (US); Matthew J. Allington, Midland, MI (US); Henry A. Eurich, Saginaw, MI (US)

(73) Assignee: Delphi Technologies, Inc., Troy, MI (US)

(21) Appl. No.: 10/767,959

(22) Filed: Jan. 29, 2004

Related U.S. Patent Documents

Reissue of:
(64) Patent No.: 6,578,449
Issued: Jun. 17, 2003
Appl. No.: 10/078,290
Filed: Feb. 18, 2002

(51) Int. Cl.
*B25J 17/00* (2006.01)
*B62D 1/16* (2006.01)

(52) U.S. Cl. ..... 74/606 R; 74/492; 74/484 R; 180/78; 180/90

(58) Field of Classification Search ..... 74/606 R, 74/484 R, 492, 558, 552; 29/453; 180/78, 180/90, 315; 307/10.1; 280/775, 777, 728.2
See application file for complete search history.

(56) References Cited

U.S. PATENT DOCUMENTS 3,834,007 A * 9/1974 Lambiris ..... 29/453
4,411,331 A * 10/1983 Hanada ..... 180/78
5,067,747 A * 11/1991 Yokoyama ..... 280/777
5,450,769 A * 9/1995 Hu et al. ..... 74/492
5,636,859 A * 6/1997 Williams et al. ..... 280/728.2
5,778,734 A * 7/1998 Uchida ..... 74/552
5,802,924 A * 9/1998 Johnson et al. ..... 74/484 R
6,047,987 A * 4/2000 Cart ..... 280/775
6,116,647 A * 9/2000 Fischer et al. ..... 280/777
6,151,980 A * 11/2000 Nishitani et al. ..... 74/484 R
6,246,128 B1 * 6/2001 Sugata ..... 307/10.1
2002/0134610 A1 * 9/2002 Pastwa et al. ..... 180/315
2004/0154429 A1 * 8/2004 Rhea et al. ..... 74/558

FOREIGN PATENT DOCUMENTS

DE 2505875 * 8/1976 ..... 74/552
EP 0694431 A1 * 1/1996 ..... 74/552
GB 2282359 A * 4/1995 ..... 74/552

* cited by examiner

*Primary Examiner*—Vinh T. Luong

(57) ABSTRACT

The snap-on steering column shroud assembly includes an upper shroud and a lower shroud. The upper shroud has an upper steering shaft passage portion that is positioned vertically, axially and angularly relative to the upper steering shaft. A front edge is moved toward the steering column to move upper shroud cantilever snap fasteners into engagement with the steering column. Force is applied manually to force the upper shroud snap fasteners into a retaining position. A lower shroud is aligned with the upper shroud by alignment posts and alignment post receivers and then raised into contact with the steering column. Lower shroud cantilevered snap fasteners are manually forced into a lower shroud retaining position on the steering column. Snap connectors and snap receivers connect the upper shroud to the lower shroud.

17 Claims, 4 Drawing Sheets

SNAP-ON STEERING COLUMN SHROUD

Matter enclosed in heavy brackets [ ] appears in the original patent but forms no part of this reissue specification; matter printed in italics indicates the additions made by reissue.

TECHNICAL FIELD

A snap-on steering column shroud assembly includes an upper shroud and a lower shroud with integral snap fasteners and snap connectors that connect both shrouds to the upper end of a vehicle steering column and to each other.

BACKGROUND OF THE INVENTION

Steering column shroud assemblies on the upper end of steering columns have a lower shroud and an upper shroud. The lower shroud is generally connected to the bottom of the steering column by two or more threaded fasteners. An upper shroud is generally connected to the steering column by threaded fasteners or connected to the lower shroud. Alignment members may be provided to maintain alignment between the upper shroud and the lower shroud.

The shroud assembly covers a number of steering column components such as the steering wheel tilt or rake adjustment, turn signal controls, window wiper controls, window washer controls, emergency flasher controls, and gear ratio selectors. One of the two shrouds is generally attached to the steering column first using threaded fasteners that screw into threaded bores in the steering column assembly. Generally the lower shroud is attached first. Aligning screws with the threaded bore or bores in a steering column can be a time consuming task especially when the column is mounted in a vehicle on an assembly line and the threaded bores are under the column where it is difficult to see. Even if the upper shroud is attached first, it can be difficult to align a bore through the shroud with a threaded bore in the steering column and then screw a threaded fastener into the threaded bore while holding the shroud with one hand. After the first shroud is attached to a steering column, a second shroud is moved into place, fastened to the first shroud or aligned with the first shroud and fastened to the steering column. In some cases it may be necessary to align the first and second shrouds with each other and then secure one of the shrouds to the steering column.

Inserting threaded screws into threaded bores to attach shrouds to a steering column assembly, and tightening the screws to hold the shrouds in proper alignment with each other and the steering column assembly may also be a problem. Small screws can be difficult to align with a threaded bore. Small screws are also easy to cross thread. Screwing screws into threaded bores is tiring and may result in repetitive motion injuries on an assembly line.

SUMMARY OF THE INVENTION

The snap-on steering column shroud assembly has an upper shroud of molded one-piece construction. The upper shroud includes a first upper parting edge, a second upper edge, an upper shroud upper end steering shaft passage portion, and a plurality of upper steering column engaging cantilever snap fasteners. A lower shroud of molded one-piece construction including a first lower parting edge, a second lower parting edge, a lower shroud upper end steering shaft passage portion and a plurality of lower steering column engaging cantilever snap fasteners. A first side elongated guide post and guide post receiver and a second side elongated guide post and guide post receiver cooperate to align the lower shroud with the upper shroud. A plurality of first parting edge snap receivers and first parting edge snap connectors adjacent to the first upper parting edge and the first lower parting edge cooperate with each other to hold the first upper parting edge and the first lower parting edge in alignment and engagement with each other. A plurality of second parting edge snap receivers and second parting edge snap connectors adjacent to the second upper parting edge and the second lower parting edge cooperate with each other to hold the second upper parting edge and the second lower parting edge in alignment and engagement with each other.

BRIEF DESCRIPTION OF THE DRAWINGS

Presently preferred embodiments of the invention are disclosed in the following description and in the accompanying drawings, wherein.

DETAILED DESCRIPTION OF PREFERRED EMBODIMENT

Figure 1:
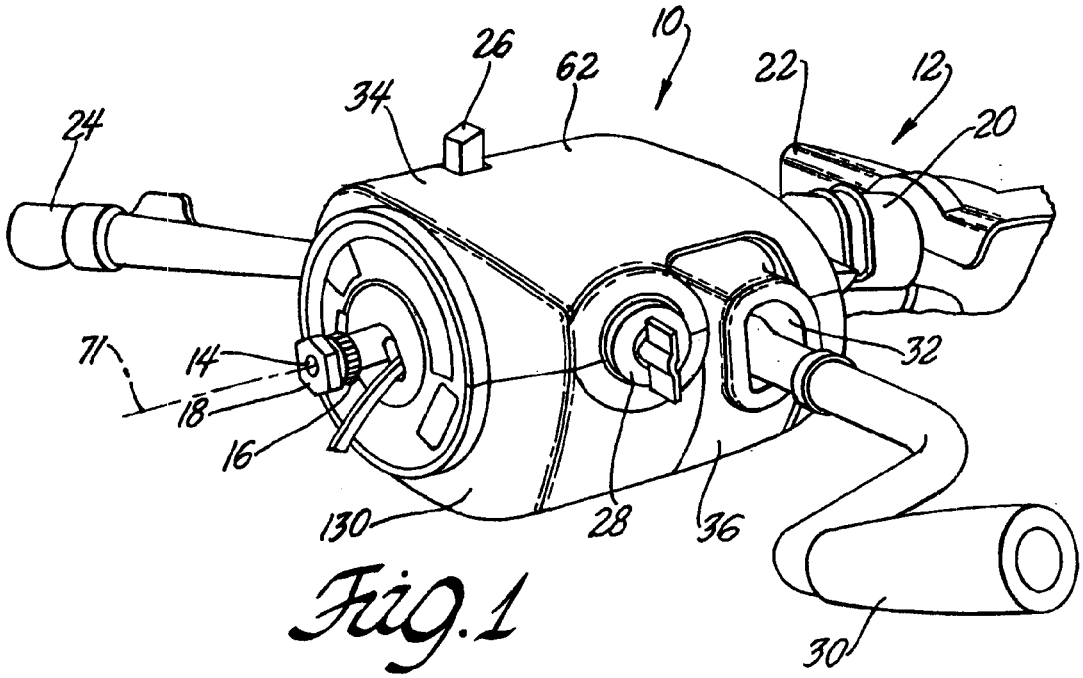
FIG. 1 is a perspective view of the shroud assembly attached to a steering column with parts broken away.

The shroud assembly 10, is mounted on the upper end of a vehicle steering column assembly 12. The steering column assembly 12 has an upper shaft 14 with male splines 16 that engage steering wheel splines in a steering wheel bore (not shown). A nut 18 clamps a steering wheel to the shaft 14. The upper steering shaft 14 is connected to a lower steering shaft that passes through a steering jacket 20. A mounting bracket 22 on the jacket 20 is clamped to a vehicle body. The steering column 12 can carry switches controlled by a turn signal lever 24. The turn signal lever 24 as shown also selects high beam or low beam lights, window washers, window wipers, and turns a cruise control system on and off. Emergency flasher lights are activated by a flasher switch control 26 mounted on the steering column 12. An ignition switch 28 is mounted on the steering column assembly 12 in a position in which a steering lock can be engaged or disengaged by the switch. A gear ratio selector lever 30 is also mounted on the steering column assembly 12. A boot 32 is connected to the gear ratio selector lever 30 and the shroud assembly 10 to cover some of the shift linkage.

The controls mentioned above can be moved to other locations. The gear ratio selector 30 can be mounted on the floor of the passenger compartment, on a console between the front seats or on the instrument panel. The ignition switch 28 could be mounted on the instrument panel. The window washer and light controls can be on the instrument panel. Some of the controls can be mounted on the steering wheel if desired. The shroud assembly 10 is modified as required to accommodate the controls mounted on the upper end of the steering column assembly 12.

The shroud assembly 10 for the upper end of a steering column assembly 12 includes an upper shroud 34 and a lower shroud 36. The upper shroud 34 is a one-piece molded member that covers the top of the steering column assembly and extends forward from the steering wheel toward the instrument panel. A first upper parting edge 38 on the left hand side of the upper shroud 34 extends forward from an upper semi-cylindrical steering shaft passage portion 40 to a forward edge 42. A semi-cylindrical upper turn signal control lever passage portion 44 is provided in the first parting edge 38 a short distance forward of the upper steering shaft passage portion 40. An upper second parting edge 46, on the right hand side of the upper shroud 34, extends forward from the upper steering shaft passage portion 40 to a forward edge 42. A semi-circular upper ignition switch passage portion 48 is provided in the second parting edge 46 a short distance forward of the steering shaft passage 40. Vehicles, with a column mounted gear ratio selector 30, have a generally rectangular upper shift lever passage 52, between the ignition switch passage portion 48 and the forward edge 42. The ignition switch 28 is raised up above the steering shaft [16] *14* and is forward of the steering shaft passage 40. Upper second parting edge portions 56 and 58 extend downward and inward from the ignition switch passage portion 48 to accommodate the raised position of the ignition switch 28. An emergency flasher switch controller passage 60 is provided in the upper shroud 34.

The upper shroud 34 has an exterior surface 62 and an interior surface 64. A recess 66 is provided in the inner surface 64 to accommodate a portion of the steering column assembly 12 without changing the contour of the exterior surface 62. The thickness of the upper shroud 34 is reduced by the recess 66.

A vertical guide blade 68 protrudes forwardly adjacent to the steering shaft passage portion 40 of the upper shroud 34. During assembly, the vertical guide blade 68 contacts the steering column assembly 12 to position the upper shroud 34 in a fore and aft direction and an upper shroud guide post 70 contacts the steering column and positions the shroud angularly about the axis 71 of the upper steering shaft 14.

Cantilever snap fasteners 72 and 74 extend vertically downward from the interior surface 64 of the upper shroud 34. These snap fasteners 72 and 74 have lead-in alignment surfaces 76 and 78 for lateral adjustment with the steering column assembly 12. The fasteners 72 and 74 also have lead-in alignment surfaces 80 and a retainer ledge 82. The retainer ledges 82 of the cantilever snap fasteners 72 and 74 engage surfaces on the steering column assembly 12 and resist upward movement of the upper shroud 34 relative to the column assembly. The retainer ledges 82 have cam surfaces 83 that urge the upper shroud 34 toward the column assembly 12. Stabilized posts 84 and 86 limit deflection of the upper shroud 34 toward the steering column assembly 12 and downward when loads are applied to the exterior surface 62 of the shroud. The guide posts 70 and the guide blade 68 may also function as stabilizer posts and resist loads applied to the exterior surface 62 of the shroud 34. A pair of elongated alignment posts 88 and 90 extend vertically downward from the interior surface 64 adjacent to the steering shaft passage portion 40. A left or first side alignment or elongated guide post 88 is to the left of the steering shaft passage 40 and spaced apart from the turn signal control lever passage portion 44 a short distance. A right or second side alignment or elongated guide post 90 is to the right side of the steering shaft passage 40 and rearward of the ignition switch passage 48.

Figure 5:
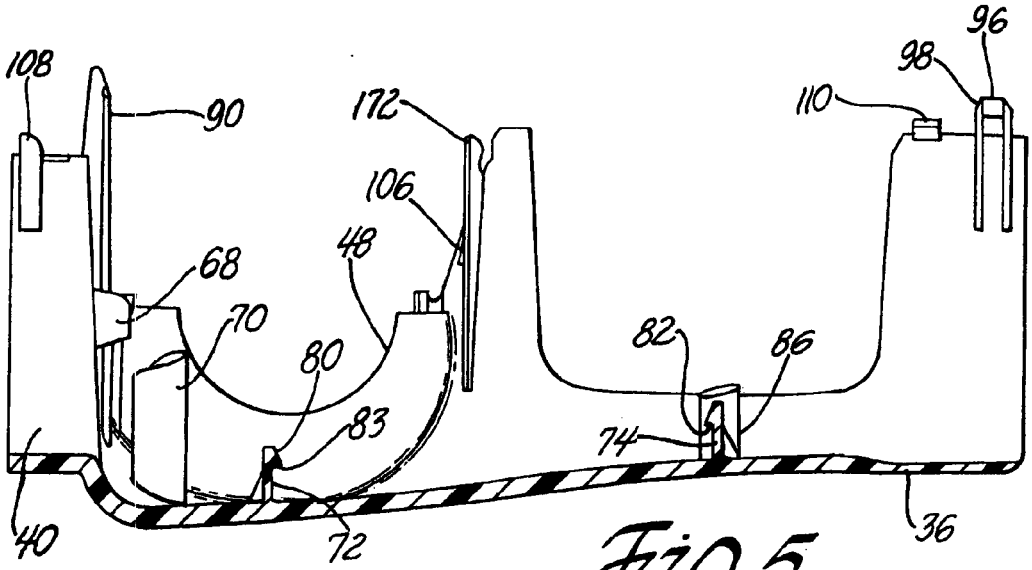
FIG. 5 is a vertical sectional view of the upper shroud taken along line 5—5 in FIG. 2.
Figure 6:
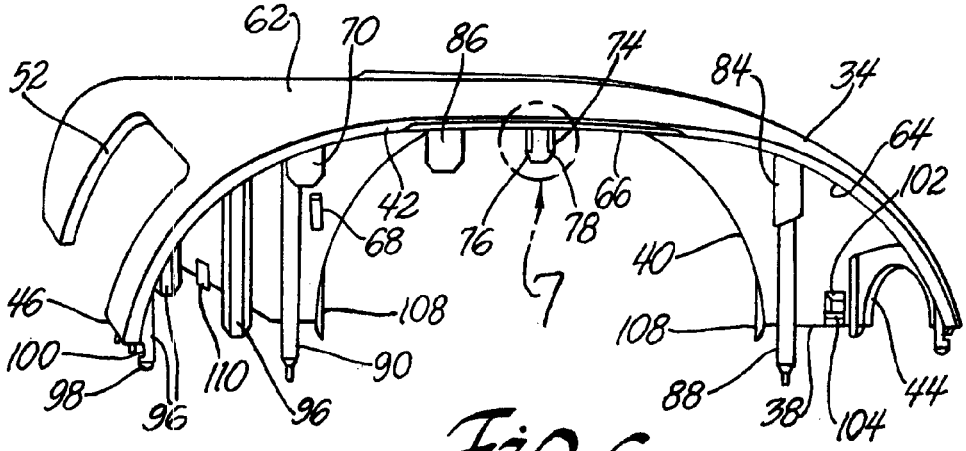
FIG. 6 is a front elevational view of the upper shroud taken along line 6—6 in FIG, 2.
Figure 7:
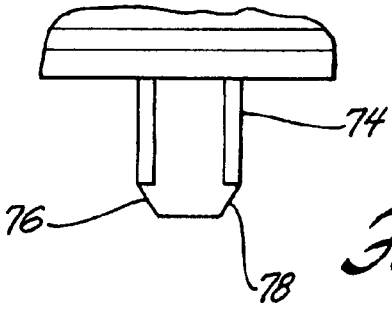
FIG. 7 is an enlarged view of the cantilevered snap fastener shown in area 7 in FIG. 6.
Figure 8:
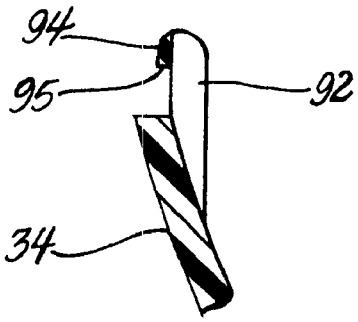
FIG. 8 is an enlarged sectional view taken along line 8—8 in FIG. 2 with parts broken away.
Figure 9:
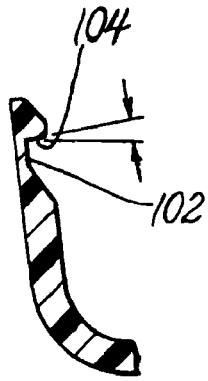
FIG. 9 is an enlarged sectional view taken along line 9—9 in FIG. 4 with parts broken away.
Figure 10:
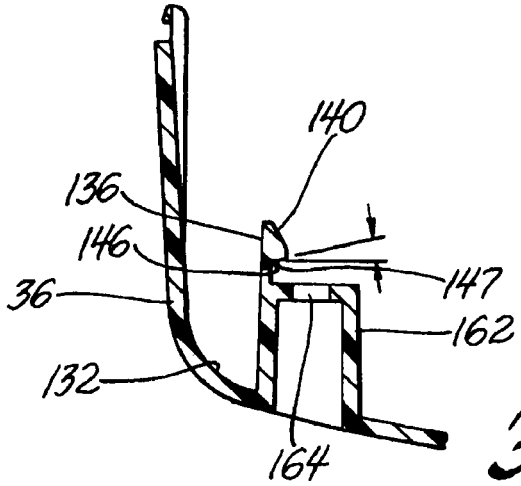
FIG. 10 is an enlarged sectional view taken along line 10—10 in FIG. 3 with parts broken away.

A plurality of left or first parting edge snap connectors 92 are integral with the upper shroud 34 and extend vertically downward from the interior surface 64 adjacent to the first upper parting edge 38. Each snap connector 92 has three lead-in surfaces 94 and a retainer ledge 95. A plurality of right or second parting edge snap connectors 96 are integral with the upper shroud 34 and extend vertically downward from the interior surface 64 adjacent to the second parting edge 46. Each snap connector 96 has three lead-in surfaces 98 and a retainer ledge 100. A snap receiver recess 102 is provided adjacent to the turn signal control lever passage 44. A snap holder 104 in the receiver recess 102 engages a retainer ledge 100. The snap holder 104 as shown in FIGS. 6 and 9, is a wedge surface that cams the snap connector 96 vertically and urges the upper shroud 34 and the lower shroud 36 toward each other. A snap receiver recess 106 is provided adjacent to the ignition switch passage 48, as shown in FIG. 5. This recess 106 also has a snap holder 104. Alignment pins 108 and alignment walls 110 are provided as required to align the lower shroud 36 with the upper shroud 34.

The lower shroud 36 is a one-piece molded membrane that covers the bottom of the upper end of the steering column 12 and extends forward from the steering wheel toward the instrument panel. A first lower parting edge 112 extends forward from a lower semi-cylindrical steering passage portion 114 to a forward edge 115. A semi-circular lower turn signal control lever passage portion 116 is provided in the lower parting edge 112 a short distance forward of the lower steering shaft passage portion 114. A second lower parting edge 118, on the right hand side of the lower shroud 36 extends forward from the lower steering shaft passage portion 114 to the forward edge 115. A semi-circular lower ignition switch passage portion 120 is provided in the second lower parting edge 118 a short distance forward of the steering shaft passage portion 114. Vehicles, with a column mounted gear ratio selector 30, have a generally rectangular lower shift lever passage portion 122, between the lower ignition switch passage portion 20 and the forward edge 115. The ignition switch 28 is raised up above the steering shaft 16 and is forward of the lower steering shaft passage 114 as explained above. Second lower parting edge portions 124 and 126 of the second lower parting edge 118 extend downwardly and inwardly from the ignition switch passage portion 120. A steering wheel tilt assembly control lever passage 128 is provided in the lower shroud 36 below the first lower parting edge 112 and forward of the turn signal control lever passage portion 116. For steering column assemblies 12 without a tilt steering wheel, the lever passage 128 can be eliminated.

The lower shroud 36 has an exterior surface 130 and an interior surface 132. A reinforcing rib 134 reinforces a portion of the forward edge 115.

Figure 4:
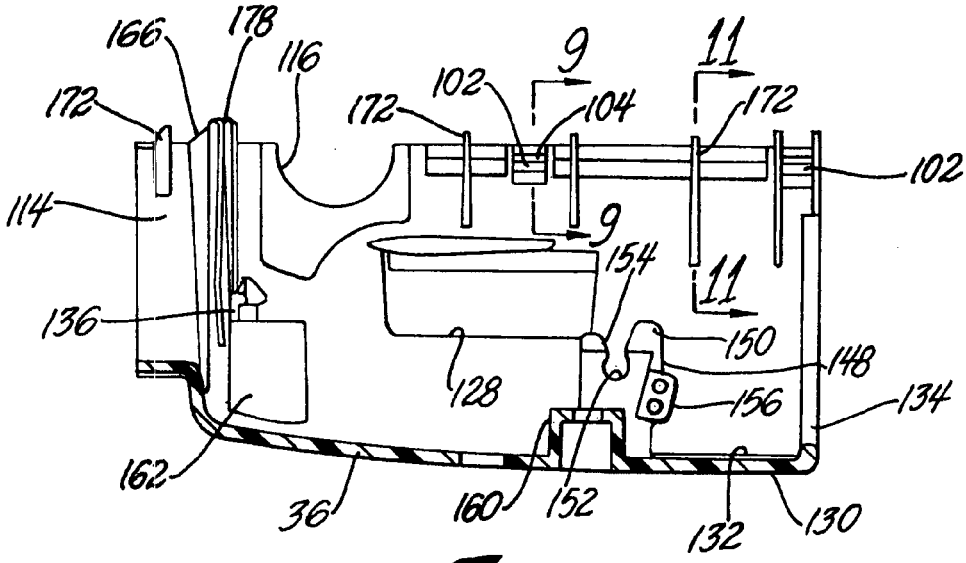
FIG. 4 is a vertical sectional view of the lower shroud taken along line 4—4 of FIG. 3.
Figure 2:
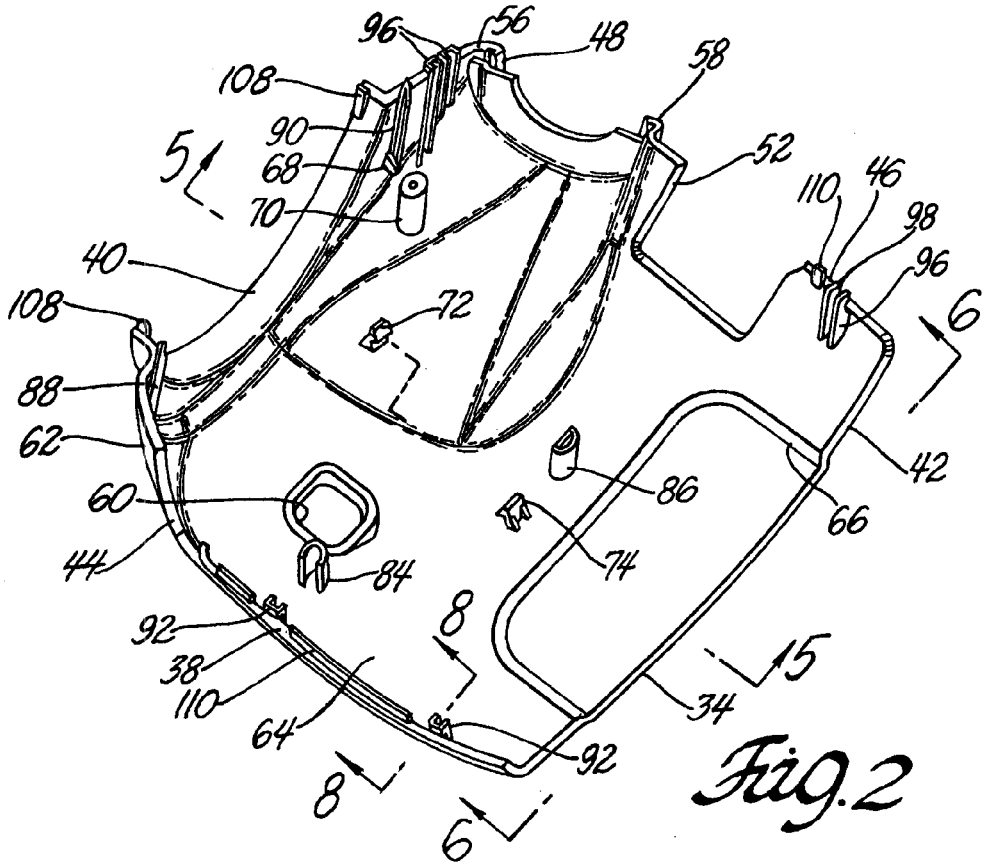
FIG. 2 is a perspective view of the upper shroud showing the interior surfaces.
Figure 3:
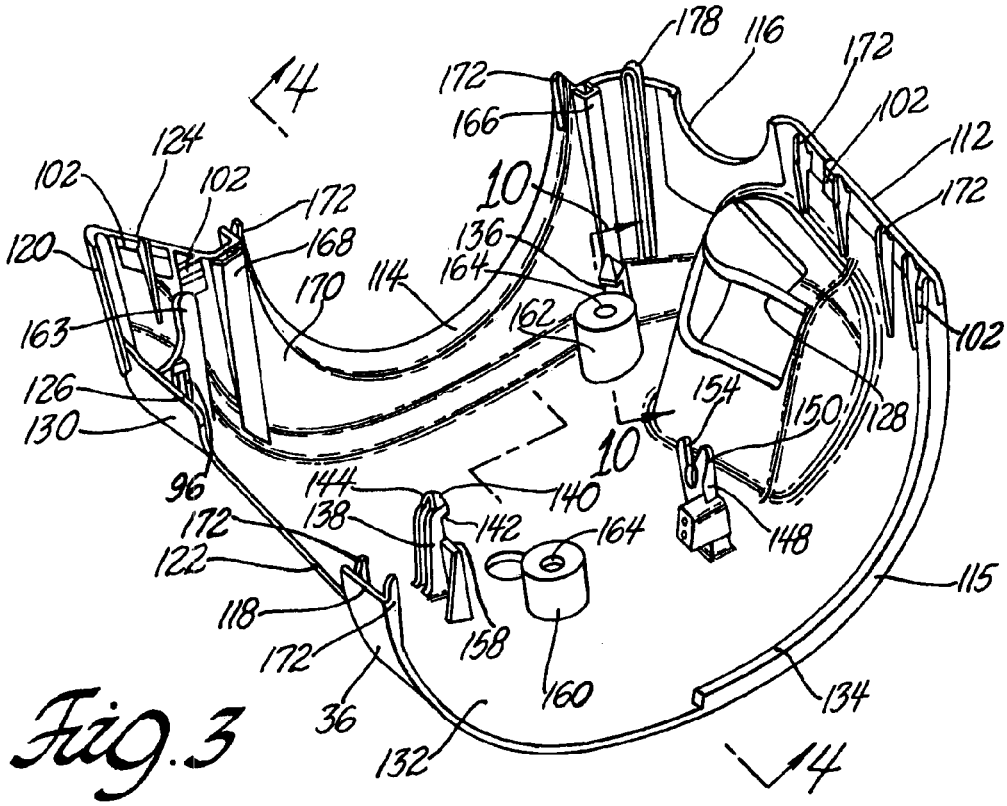
FIG. 3 is a perspective view of the lower shroud showing the interior surfaces.

Cantilevered lower snap fasteners 136 and 138 extend vertically upward from the interior surface 132. These lower fasteners 136 and 138 both have three lead-in alignment surfaces 140, 142 and 144 for providing alignment between the lower shroud 36 and the steering column assembly 12. A retainer ledge 146 on each lower cantilever snap fastener 136 and 138 engages a surface on the steering column assembly 12 and resists downward movement of the lower shroud 36 relative to the column assembly. A clothespin-shaped snap fastener 148 also extends upward from the interior surface 132. This snap fastener 148 has lead-in alignment surfaces 150 that laterally align the lower shroud 36 with the steering column assembly 12. The snap fastener 148 also has pocket 152, shown in FIG. 4, which receives a rod on the column assembly and snaps around the rod. The rod lead-in surfaces 154 on the snap fasteners 148 guides a rod into the pocket 152 to hold the lower shroud 36 in a fixed vertical position relative to the column assembly 12. A tilt adjustment lever stop and cushion holder 156 is integral with the snap fastener 148.

Stabilized posts 158, 160, 162, and 163 extend vertically upward from the interior surface 132 and limit upward movement of the lower shroud 36 in response to outside forces. The posts 158 and 163 are blade shaped members. The stabilizer posts 160 and 162 are hollow cylindrical members with screw bores 164. If the lower cantilevered snap fasteners 136 and 138 or the clothespin-shaped snap fastener are damaged, screws can be inserted through the screw bores 164 and screwed into threaded bores in the column assembly 12. Screws are not required during initial assembly. However, the cantilevered snap fasteners 136 and 138 can be damaged during a disassembly or steering column 12 for maintenance and repair. By using screws, the replacement of the lower shroud 36 by a new shroud can be avoided.

A first alignment or guide post receiver 166 and a second alignment or guide post receiver 168 are integral with a rear wall 170 of the lower shroud 36. A number of lower shroud alignment plates 172 are integral with the lower shroud and extend vertically upward adjacent to the first lower parting edge 112, the second lower parting edge 118 and the lower steering shaft passage portion 114. These shroud alignment plates 172 are provided adjacent to the snap receiver recesses 102 with snap holders 104. In other areas the alignment plates 172 form pockets with the interior surface 132 that receives the short alignment walls 110 to laterally fix the exterior surface 62 of the upper shroud 34 relative to the exterior surface 130 of the lower shroud 36 at the parting edges 38, 46, 56, 58, 112 and 118. A snap connector 178 on a lower shroud 36 and adjacent to the turn signal control lever passage portion 116 is engageable with a snap holder 104 in a snap receiver recess 102 in the upper shroud 34, shown in FIG. 6. A snap receiver recesses 102 on the rear wall 170 of the lower shroud 36 receives the snap connectors 96 on the upper shroud 34 between the steering shaft passage portion 40 and the ignition switch passage portion 48.

During assembly of the shroud assembly 10, the upper shroud 34 is attached first. To attach the upper shroud 34, the upper steering shaft passage portion 40 and the vertical guide blade 68 are moved into contact with the upper rear portion of the steering column assembly 12. The upper steering shaft passage portion 40 positions the rear portion of the upper shroud 34 vertically relative to the column assembly 12. The vertical guide blade 68 positions the upper shroud 34 axially relative to the upper steering shaft 14 and limits forward movement of the upper shroud. The upper shroud 34 is then rotated about the axis of the upper steering shaft 14 until guide posts 70 contacts the steering column assembly 12. The forward edge 42 of the upper shroud 34 is then moved downward to move the cantilevered snap fasteners 72 and 74 into contact with the steering column assembly 12. It may be necessary to move the upper shroud 34 slightly from side to side and slightly fore and aft to align the cantilever snap fasteners 72 and 74 with passages in the steering column assembly 12 or with edge surfaces of the column assembly. Lead-in alignment surfaces 76, 78 and 80 on the cantilever snap fasteners 72 and 74 guide the snap fasteners into the passages in the steering column assembly 12. Vertical pressure downward on the upper shroud 34 springs the cantilever snap fasteners 72 and 74 relative to each other until the retainer ledges 82 snap into place and secure the upper shroud 34 to the steering column assembly 12. The stabilizer posts 84 and 86 and the guide post 70 limit downward movement of the upper shroud 34. The retainer ledges 82 on the cantilever snap fasteners 72 and 74 includes inclined cam surfaces 83 that urge the guide post 70 and the stabilizer posts 84 and 86 toward engagement with the steering column assembly, fix the position of the upper shroud 34 and limit movement between the upper shroud and the steering column assembly 12.

A boot assembly 32 for the gear ratio selector 30 is attached to the upper shroud 34 if a column mounted selector lever is employed. The boot assembly 32 may be attached either before or after the lower shroud 36 is attached depending upon the system for securing the boot assembly in place.

The lower shroud 36 is attached to the steering column assembly 12 by sliding the steering column tilt or rake adjustment lever through the tilt assembly control lever passage 128, if the steering column assembly 12 has a tilt or rake adjustment with an adjustment lever positioned to pass through the shroud 36. The two alignment post receivers 166 and 168 are then raised up to telescopically receive the elongated alignment posts 88 and 90. The receivers 166 and 168 are somewhat larger than the alignment posts 88 and 90 to permit the lower semi-cylindrical steering shaft passage portion 114 to move into contact with the steering column assembly first. After the steering shaft passage portion 114 of the lower shroud 36 contacts the steering column assembly 12, the forward edge 115 of the lower shroud is pivoted upward. The cantilever lower snap fasteners 136 and 138 and the clothespin-shaped snap fastener 148 are moved into or toward the steering column assembly 12. The lower shroud 36 is then moved slightly from side to side and fore and aft to align the cantilever lower snap fasteners 136 and 138 as well as the clothespin-shaped snap fastener 148 with the snap fastener receivers on the steering column assembly 12. The lead-in alignment surfaces 140, 142 and 144 on the snap fasteners 136 and 138 and the lead-in alignment surfaces 150 and 154 on the clothespin-shaped fastener 148 guide the fasteners into an aligned position as upward pressure is applied to the lower shroud 36. The retainer ledges 146 on the cantilever lower snap fasteners 136 and 138 snap into retaining positions when the lower shroud 36 is moved upward to a locked position. The retainer ledges 146 have cam surfaces 147 that urge the lower shroud 36 toward the column assembly 10. Stabilizer posts 158, 160, 162 and 163 limit upward movement of the lower shroud 36. The clothespin-shaped fastener 148 snaps into a locked position and limits upward and downward movement of the lower shroud 46. The cam surfaces 147 of the retainer ledges 146 on the cantilever snap fasteners 136 and 138 urge the lower shroud stabilizer posts 158, 160 and 162 toward engagement with the steering column assembly 12. In the event that a cantilever lower snap fasteners 136 or 138 fails, screws can be inserted in the stabilizer posts 160 and 162 and screwed into the steering column assembly 12.

Figure 11:
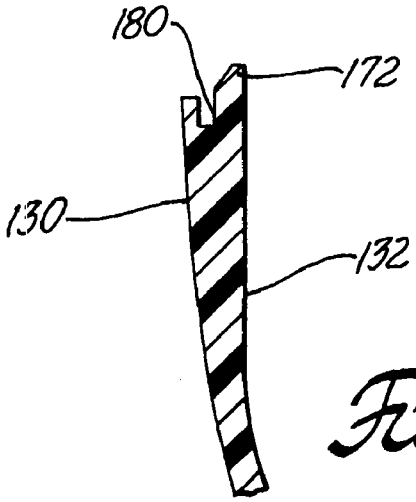
FIG. 11 is an enlarged sectional view taken along line 11—11 in FIG. 4 with parts broken away.

The parting edge snap connectors 92, 96, and 178 and the parting edge snap receiver recesses 102 and 106 move into engagement with each other and connect the parting edges 38, 46, 56 and 58 on the upper shroud 34 to the parting edges 112, 118, 124 and 126 on the lower shroud 36. The parting edge snap connectors 92, 96, and 178 and the snap receiver recesses 102 and 106 can be switched between the upper shroud 34 and the lower shroud 36 as desired as long as each snap connector on one shroud can engage a snap receiver on the other shroud. The shroud alignment plates 172 cooperate with interior surface 132 of the lower shroud 36 to form slots 180 shown in FIG. 11. The slots 180 receive the alignment walls 110 to fix the upper shroud 34 relative to the lower shroud 36.

Shrouds 34 and 36 are manually removable if screws have not been inserted through the screw bores 164 in the stabilizer posts 160 and 162 and screwed into the steering column assembly 12. The lower shroud 36 is removed by manually pulling down on the shroud while simultaneously moving the shroud from side to side as well as fore and aft. The upper shroud 34 is removed by pulling up on the shroud while simultaneously moving the shroud from side to side and fore and aft. Both shrouds 34 and 36 can normally be removed without breaking any of the snap connectors 92, 96 and 178 or cantilevered snap fasteners 72, 74, 136 or 138.

The disclosed embodiments are representative of presently preferred forms of the invention, but are intended to be illustrative rather than definitive thereof. The invention is defined in the claims.

What is claimed is:

1. A snap-on steering column shroud assembly comprising:

an upper shroud of molded [one-piece] construction including a first upper parting edge, a second upper parting edge, an upper shroud upper end steering shaft passage portion[, and a plurality of upper shroud steering column assembly engaging cantilever snap fasteners], *and at least one upper shroud stabilizer post that limits deflection of the upper shroud toward the lower shroud*;

a lower shroud of molded [one-piece] construction including a first lower parting edge, a second lower parting edge, a lower shroud upper end steering shaft passage portion[, and a plurality of lower shroud steering column assembly engaging cantilever snap fasteners], *and at least one lower shroud stabilizer post that limits deflection of the lower shroud toward the upper shroud*;

a first side elongated guide post and a first guide post receiver[, and a second side elongated guide post and a second guide post receiver that cooperate to align the lower shroud with the upper shroud];

a plurality of first parting edge snap receivers and a plurality of first parting edge snap connectors adjacent to the first upper parting edge and the first lower parting edge, that cooperate with each other to hold the first upper parting edge and the first lower parting edge in alignment with each other; and a plurality of second parting edge snap receivers and a plurality of second parting edge snap connectors adjacent to the second upper parting edge and the second lower parting edge that cooperate with each other and hold the second upper parting edge and the second lower parting edge in alignment with each other.

[2. A snap-on steering column shroud assembly as set forth in claim 1 wherein each of the plurality of upper shroud steering column assembly engaging cantilever snap fasteners has a retainer ledge with a cam surface for urging the upper shroud toward the lower shroud; and each of the plurality of lower shroud steering column assembly engaging cantilever snap fasteners has a retainer ledge with a cam surface for urging the lower shroud toward the upper shroud.]

3. A snap-on steering column shroud assembly as set forth in claim [2] *1* wherein the upper shroud includes a plurality of upper shroud stabilizer posts that limit deflection of the upper shroud toward the lower shroud; and *the lower shroud includes* a plurality of lower shroud stabilizer posts that limit deflection of the lower shroud toward the upper shroud.

4. A snap-on steering column assembly as set forth in claim 1 wherein each of the plurality of first parting edge snap receivers include a first snap holder wedge surface that urges the upper shroud and the lower shroud toward each other; and wherein each of the plurality of second parting edge snap receivers include a second snap holder wedge surface that urges the upper shroud and the lower shroud toward each other.

5. A snap-on steering column shroud assembly as set forth in claim 1 including an upper shroud guide blade that extends forwardly from an upper shroud interior surface and that axially positions the upper shroud along an axis of an upper steering shaft during mounting of the upper shroud on a steering column assembly.

6. A snap-on steering column shroud assembly as set forth in claim 5 including an upper shroud guide post that limits rotation of the upper shroud in one direction about the axis of the upper steering shaft.

7. A snap-on steering column shroud assembly as set forth in claim 1 including an upper shroud guide post extending inwardly from an upper shroud interior surface and that limits rotation of the upper shroud in one direction about an axis of an upper steering shaft.

8. A snap-on steering column shroud assembly comprising:

an upper shroud of molded one-piece construction including a first upper parting edge, a second upper parting edge, an upper shroud upper end steering shaft passage portion, a plurality of upper shroud steering column assembly engaging cantilever snap fasteners, and a plurality of upper shroud deflection limiting posts;

a lower shroud of molded one-piece construction including a first lower parting edge, a second lower parting edge, a lower shroud upper end steering shaft passage portion, a plurality of lower shroud steering column assembly engaging cantilever snap fasteners, and a plurality of lower shroud deflection limiting posts;

a first side elongated guide post and a first side guide post receiver, and a second side elongated guide post and a second side guide post receiver that cooperate to align the lower shroud with the upper shroud;

a plurality of first parting edge snap receivers and a plurality of first parting edge snap connectors adjacent to the first upper parting edge and the first lower parting edge, that cooperate with each other to hold the first upper parting edge and the first lower parting edge in alignment with each other; and a plurality of second parting edge snap receivers and a plurality of second parting edge snap connectors adjacent to the second upper parting edge and the second lower parting edge that cooperate with each other and hold the second upper parting edge and the second lower parting edge in alignment with each other.

9. A snap-on steering column shroud assembly as set forth in claim 8 wherein each of the plurality of upper shroud steering column assembly engaging cantilever snap fasteners has a retainer ledge with a cam surface for urging the upper shroud toward the lower shroud; and each of the plurality of lower shroud steering column assembly engaging cantilever snap fasteners has a retainer ledge with a cam surface for urging the lower shroud toward the upper shroud.

10. A snap-on steering column shroud assembly as set forth in claim 8 wherein each of the plurality of first parting edge snap receivers include a first snap holder wedge surface that urges the upper shroud and the lower shroud toward each other; and wherein each of the plurality of second parting edge snap receivers include a second snap holder wedge surface that urges the upper shroud and the lower shroud toward each other.

11. A snap-on steering column shroud assembly as set forth in claim 8 including an upper shroud guide blade that extends forwardly from an upper shroud interior surface and that axially positions the upper shroud along an axis of an upper steering shaft during mounting of the upper shroud on a steering column assembly.

12. A snap-on steering column shroud assembly as set forth in claim 11 including an upper shroud guide post that limits rotation of the upper shroud in one direction about the axis of the upper steering shaft.

13. A snap-on steering column shroud assembly as set forth in claim 8 including an upper shroud guide post extending inwardly from an upper shroud interior surface and limits rotation of the upper shroud in one direction about an axis of an upper steering shaft.

14. A snap-on steering column shroud assembly comprising:

an upper shroud of molded one-piece construction including a first upper parting edge, a second upper parting edge, an upper shroud upper end steering shaft passage portion, and a plurality of upper shroud steering column assembly engaging cantilever snap fasteners;

a lower shroud of molded one-piece construction including a first lower parting edge, a second lower parting edge, a lower shroud upper end steering shaft passage portion, and a plurality of lower shroud steering column assembly engaging cantilever snap fasteners;

a plurality of first parting edge snap receivers and a plurality of first parting edge snap connectors adjacent to the first upper parting edge and the first lower parting edge, that cooperate with each other to hold the first upper parting edge and the first lower parting edge in alignment with each other; and a plurality of second parting edge snap receivers and a plurality of second parting edge snap connectors adjacent to the second upper parting edge and the second lower parting edge that cooperate with; each other and hold the second upper parting edge and the second lower parting edge in alignment with each other.

15. A snap-on steering column shroud assembly, as set forth in claim 14, wherein the upper shroud includes at least one integral deflection limiting post, and the lower shroud includes at least one integral deflection limiting post.

16. A snap-on steering column shroud assembly, as set forth in claim 14, wherein each of the plurality of upper shroud steering column assembly engaging cantilevered snap fasteners has an upper shroud retainer ledge with an upper shroud cam surface for urging upper shroud toward the lower shroud; and each of the plurality of lower shroud steering column assembly engaging cantilevered snap fasteners has a lower shroud retainer ledge with a lower shroud cam surface for urging the lower shroud toward the upper shroud.

17. A snap-on steering column shroud assembly, as set forth in claim 14, wherein each of the plurality of first parting edge snap receivers include a first snap holder wedge surface that urges the first upper parting edge and the first lower parting edge toward each other; and wherein each of the plurality of second parting edge snap receivers includes a second snap holder wedge surface that urges the second upper parting edge and the second lower parting edge toward each other.

18. A snap-on steering column shroud assembly comprising:

an upper shroud of molded one-piece construction including a first upper parting edge, a second upper parting edge, and upper shroud upper end steering shaft passage portion, a plurality of upper shroud steering column assembly engaging cantilever snap fasteners, and a plurality of upper shroud deflection limiting posts;

a lower shroud of molded one-piece construction including a first lower parting edge, a second lower parting edge, a lower shroud upper end steering shaft passage portion, a plurality of lower shroud steering column assembly engaging cantilever snap fasteners, and a plurality of lower shroud deflection limiting posts;

a plurality of first parting edge snap receivers and a plurality of first parting edge snap connectors adjacent to the first upper parting edge and the first lower parting edge, that cooperate with each other to hold the first upper parting edge and the first lower parting edge in alignment with each other; and a plurality of second parting snap receivers and a plurality of second parting edge snap connectors adjacent to the second upper parting edge and the second lower parting edge that cooperate with each other and hold the second upper parting edge and the second lower parting edge in alignment with each other.

* * * * *